United States Patent [19]

Legerius et al.

[11] Patent Number: 4,570,323
[45] Date of Patent: Feb. 18, 1986

[54] METHOD AND TOOL FOR INSERTING AN OVERDIMENSIONED ELASTIC BODY IN A CAVITY

[75] Inventors: Bengt E. Legerius, Hagvägen; Hans W. Siebert, Skrakvägen, both of Sweden

[73] Assignee: Telefonaktiebolaget L M Ericsson, Stockholm, Sweden

[21] Appl. No.: 456,016

[22] PCT Filed: Apr. 23, 1982

[86] PCT No.: PCT/SE82/00133
§ 371 Date: Dec. 15, 1982
§ 102(e) Date: Dec. 15, 1982

[87] PCT Pub. No.: WO82/03951
PCT Pub. Date: Nov. 11, 1982

[51] Int. Cl.⁴ .................. B23P 11/02; B23P 19/02
[52] U.S. Cl. .................................... 29/451; 29/235
[58] Field of Search ................... 29/451, 450, 235

[56] References Cited

U.S. PATENT DOCUMENTS

| 1,733,610 | 10/1929 | Leipert | 29/451 X |
| 1,830,814 | 11/1931 | Thiry | 29/235 X |
| 2,696,442 | 12/1954 | Allbright | 29/451 X |
| 2,696,443 | 12/1954 | Allbright | 29/451 X |
| 3,139,677 | 7/1964 | Goldstein | 29/451 |

*Primary Examiner*—Charlie T. Moon
*Attorney, Agent, or Firm*—Roberts, Spiecens & Cohen

[57] ABSTRACT

A method and tool for sealingly inserting an elastic body in a cavity in a wall in which the cavity has a smaller size than the initial size of the body. A first tubular end portion of the tool is inserted into the cavity and an elastic body is accommodated in a second larger tubular end portion of the tool such that the elastic body rests on a tapered portion which joins the tubular end portions. The second tubular end portion is then closed and pressure fluid is supplied into the second tubular end portion to compress the elastic body and cause it to pass from the second tubular portion into the first tubular portion and then to exit from the first tubular portion into the cavity. The elastic body expands as it exits from the first tubular portion to tightly engage the wall around the cavity and to expel the first tubular end portion from the cavity.

8 Claims, 3 Drawing Figures

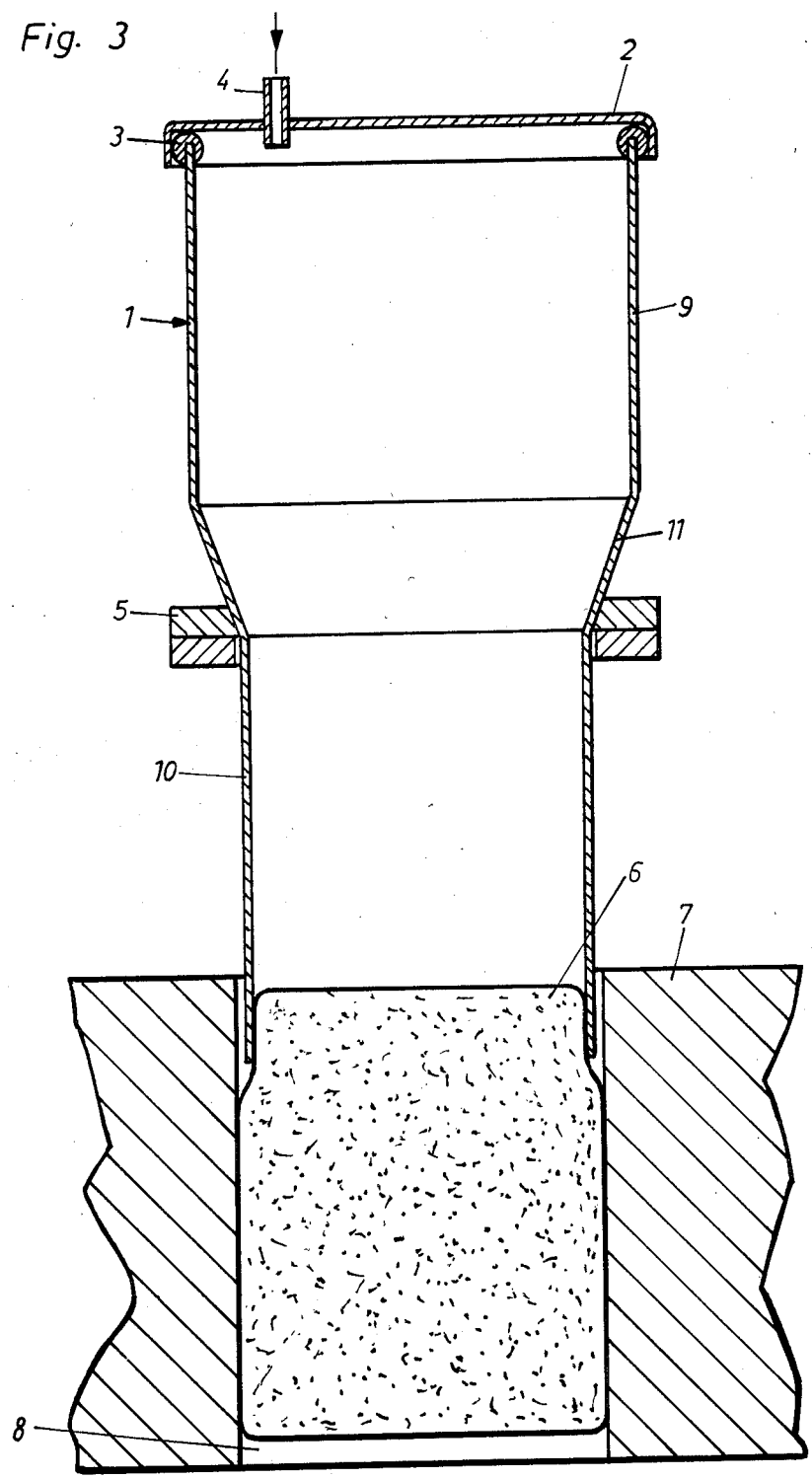

METHOD AND TOOL FOR INSERTING AN OVERDIMENSIONED ELASTIC BODY IN A CAVITY

FIELD OF THE INVENTION

The present invention relates to a method and tool for inserting an elastic body in a cavity, the dimensions of the body being substantially greater than those of the cavity. An area in which there is a need of the inventive subject is in relation to fire sealing leads-through in walls and floors for elastic cables, pipes, ventilation ducts etc. (hereinafter called conduits) going from one room to another.

BACKGROUND

Fire-sealing leads-through are commercially available in the form of prefabricated bodies with tubular shells having elastic, fire-resistant, foamed material accommodated therein, and compressed transversely of the longitudinal axis of the shell. These prefabricated bodies are intended for casting into walls and floors or prefabricated building components constituting such walls or floors. This means that it must be clear during the planning of a building which conduits are to be laid and how they are to be laid. When extending or rebuilding buildings as well as when increasing or altering the laying of conduits, the advantages provided by these prefabricated members cannot be utilized. It is then a question of attempting to seal the new holes which are made in walls and floors, using loose pieces of foamed material which are tamped in between the conduits in the holes. Alternatively, the seals can be molded in situ, but this is a complicated and time-consuming operation, if a satisfactory result is to be achieved.

SUMMARY OF THE INVENTION

The present invention has the object of enabling the use of fire-resistant foamed material in prefabricated bodies for holes in walls and floors which have been made after erection. The prefabricated bodies used in this conjunction have no shell, thus none of the precompression of the foamed material produced by the shell. This compression of the foamed material, which is a prerequisite for the fire seal to function in the intended mode, is provided in accordance with the invention by the method in which the prefabricated bodies are placed in the holes.

The invention will now be described with reference to the appended drawings, which illustrate different stages of inserting an overdimensioned elastic body in a cavity while using a preferred embodiment of a tool intended for this purpose.

DESCRIPTION OF THE FIGURES OF THE DRAWING

FIG. 3 illustrates the same tool and same building part during a later phase of the fitting operation, during which the elastic body has been accommodated in the hole and the tool is on its way out of the hole.

DESCRIPTION OF A PREFERRED EMBODIMENT

Figure 1:
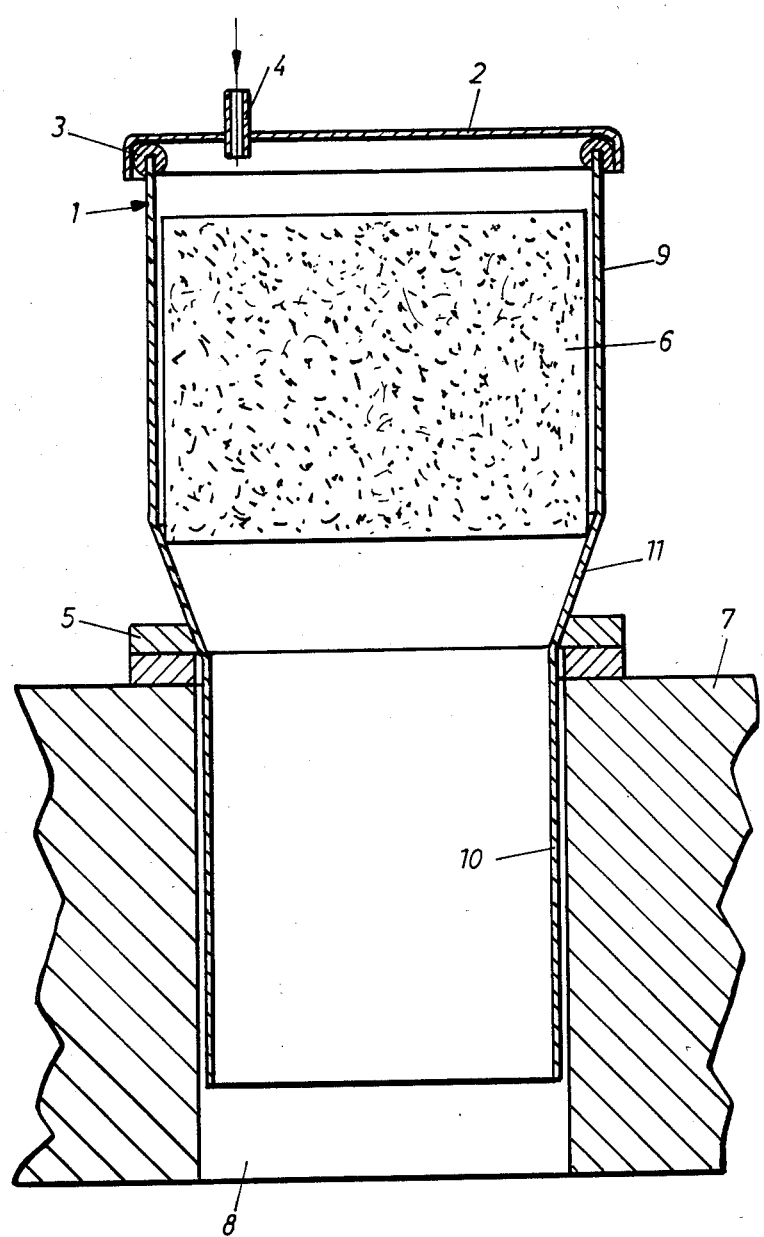
FIG. 1 illustrates a fitting tool with an elastic body placed in it, the tool being inserted in a hole in a part of a building.

FIG. 1 illustrates a fitting tool 1 with an elastic body 6 placed therein, said tool being partially inserted in a through hole 8 in a building part 7. The tool comprises two tubular portions, a first larger portion 9 dimensioned for receiving the elastic body 6, and a second smaller portion 10 dimensioned for insertion into the hole 8 to be fire-sealed. Both tubular portions forming respectively the large and the small end of the tool are united by means of a conically shaped portion 11. The tool further comprises a lid 2 closing off the large end, and engaging a gasket surrounding the large end opening, and a pipe socket 4 provided on the lid for supplying a pressurized fluid, suitably compressed air.

A spacer ring 5 is displaceably arranged on the smaller portion 10 of the tool, the spacer ring being used to preset the depth of insertion into the hole.

FIG. 1 illustrates the initial position for inserting elastic body 6 into the hole. The body 6 is inserted sufficiently far into the larger portion 9 of the tool so that its inner edge is against, and seals against the conically formed portion 11 of the tool. If the pressure in the larger portion 9 is increased by admission of compressed air, the elastic body is urged forward through the conically-shaped portion 11 and the tubular portion 10. The seal between the body and the tool is not total, and after reaching a certain pressure a portion of the compressed air passes between the body and wall of the tool to form an air cushion, which gives the necessary lubrication to enable compression the body in this mode. The foamed material used in fire seals has a high coefficient of friction and low tensile strength, and the body would be torn apart by the friction against the tool without this lubrication.

Figure 2:
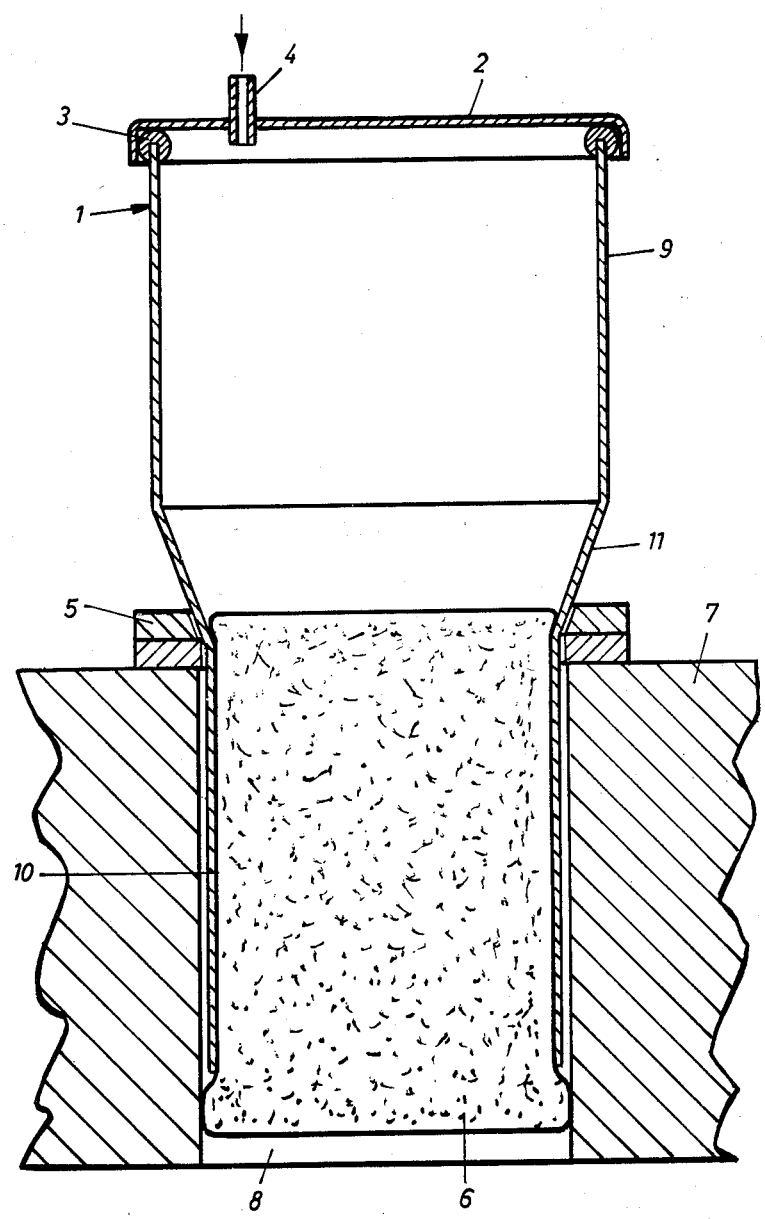
FIG. 2 illustrates the same tool and same building part during one phase of the fitting operation, during which the elastic body is about to leave the tool.

As illustrated in FIG. 2, when the front end of the body 6 leaves the tool, this end expands and fastens itself in the wall of the hole. The body can no longer move in relation to the wall, and since it still moves in relation to the fitting tool, it is now the tool which moves in relation to the wall, i.e. the tool is urged out of the hole at the rate the elastic body is urged out of the tool.

The air stream providing the lubricating air cushion disappears through the gap between the tool and the hole.

FIG. 3 illustrates the tool at a stage when the elastic body has nearly left it.

Since the body is increasingly compressed, and allows more air past it as the air pressure increases, it functions as a pressure regulator and prevents the pressure from building up to values requiring special safety measures. The necessary pressure depends on the material in the body, its dimensions, and the compression it requires to fill its function as a fire seal. As an example, it may be mentioned that for fitting a silicone rubber plug with a diameter of 160 mm made from a material marketed under the designation "Dow Corning 3-6548 RTV", the required pressure was 0.35 bar.

The method of placing an elastic body in a cavity is not confined solely to cylindrical bodies and corresponding holes, but can also be used for bodies having other cross sections, such as square or rectangular sections, these types of holes being easy to provide, for example, in masonry walls.

To enable the insertion of elastic bodies in holes made close to an adjacent wall, the fitting tool can be made with the tubular portions 9,10 mutually displaced, so that the tool has a straight longitudinal side. If the hole is made extremely close to an adjacent wall, there is also the possibility of forming an angle between the tubular portions, for example, to compensate for the overhang of the lid 2.

What is claimed is:

1. A method of sealingly inserting an elastic body in a cavity in a wall, said cavity having a smaller size than the body, said method comprising inserting a first tubular end portion of a tool into the cavity, placing the elastic body loosely in a second larger tubular end portion of the tool such that the elastic body rests on a tapered portion which joins the tubular end portions, closing the second tubular end portion, supplying pressure fluid to said second tubular end portion to radially compress axially push said elastic body to cause said body to pass from said second tubular portion into said first tubular portion and then to exit from said first tubular portion into said cavity, and allowing said elastic body to expand as it exits from said first tubular portion to tightly engage the wall around said cavity while removing said first tubular portion from said cavity.

2. A method as claimed in claim 1 wherein said first tubular end portion is loosely engaged in said cavity, said elastic body exerting force on said first tubular end portion as said elastic body exits from said first tubular end portion to expel said first tubular end portion from said cavity.

3. A method as claimed in claim 1 wherein said elastic body during its compression forming a passage therearound for flow of pressure fluid and the formation of a fluid cushion on which the elastic body rides as it travels from the second tubular portion to the first tubular portion.

4. A method as claimed in claim 1 wherein said elastic body rests on said tapered portion until the pressure of the pressure fluid reaches a value causing sufficient compression of the elastic body so that it can travel to said first tubular portion whereby said elastic body serves as a pressure regulator.

5. A method as claimed in claim 1 wherein said first tubular end portion extends into the cavity along a major portion of the length of the cavity.

6. Apparatus for sealingly inserting an elastic body in a cavity in a wall, said cavity having a smaller size then the body, said apparatus comprising a tool including first and second tubular portions, one of said tubular portions having a larger diametral extent than the other, and a tapered portion joining said first and second portions, said tubular portions having respective open ends, the open end of said one tubular portion being of a size to loosely receive the elastic body to be inserted into the cavity in the wall, said other tubular portion being of a size to be loosely inserted into the cavity in which the elastic body is to be inserted and extend along a major portion of the length of the cavity, means for sealing the open end of said one tubular portion, and means for introducing pressure fluid into said one tubular portion to apply pressure to said elastic body and compress the body and cause said body to pass from said one tubular portion to said other tubular portion and then to exit from said open end of said other tubular portion into said cavity whereat said body expands to tightly engage the wall around said cavity.

7. Apparatus as claimed in claim 6 wherein as said elastic body expands to tightly engage said wall it serves as a means for expelling said tool from said cavity.

8. Apparatus as claimed in claim 6 comprising means around said tool for limiting the depth of penetration of said other portion into said cavity.

* * * * *